March 7, 1961 F. G. F. BEHLES 2,973,968
PNEUMATIC EQUALIZATION SPRING SYSTEM FOR VEHICLES
Filed Sept. 10, 1956
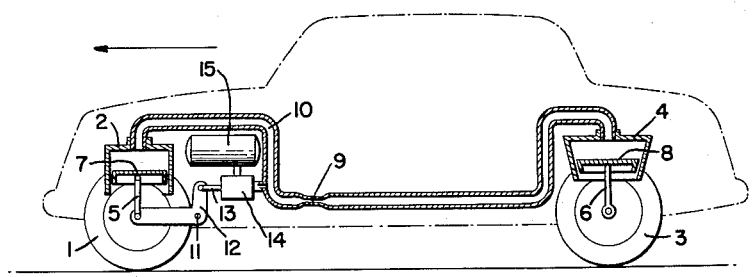
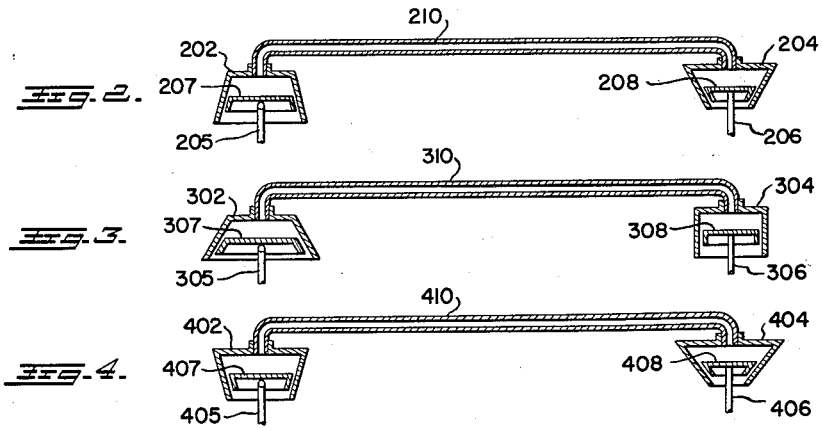
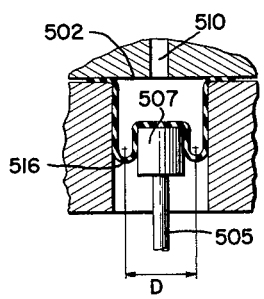 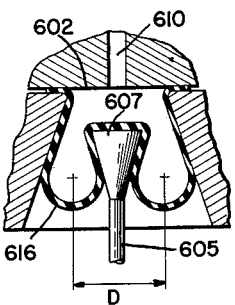 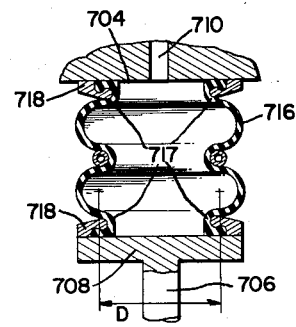
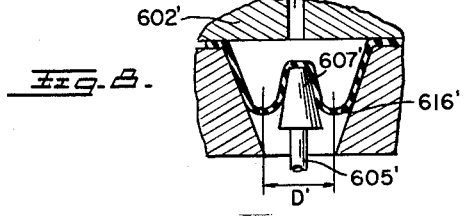
INVENTOR
FRANZ G. F. BEHLES
BY
ATTORNEYS 2,973,968
PNEUMATIC EQUALIZATION SPRING SYSTEM FOR VEHICLES

Franz G. F. Behles, Sindelfingen, Kreis Boblingen, Germany, assignor to Daimler-Benz Aktiengesellschaft, Stuttgart-Unterturkheim, Germany
Filed Sept. 10, 1956, Ser. No. 608,943
Claims priority, application Germany Sept. 12, 1955
6 Claims. (Cl. 280—104)

The present invention relates to a pneumatic equilization spring system for vehicles, and more particularly, to a pneumatic equalization spring system for motor vehicles which is so constructed as to provide the necessary stabilization of the vehicle.

The term "pneumatic equalization spring system" is used herein to designate spring and wheel, suspension or axle arrangements in which the air chambers or spaces of two pneumatic springs of which one each is associated with a respective wheel, are interconnected by an equalization line in such a manner that during spring movement of one wheel, the other wheel carries out a movement in the opposite direction with respect to the vehicle frame.

It is well known that equalization spring systems are only of practical value if during changes in the load distribution on the two wheels or axles interconnected by the equalization line the vehicle frame remains at least approximately parallel to the road bed, and if the arrangement which, as is known in connection with all equalization spring systems which are inherently unstable with respect to rotations of the vehicle about a horizontal cross axis, is stabilized. The usual manner for the realization of these requirements resides in the use of additional springs between the wheel and the frame. Such is the solution ordinarily employed in prior art devices. The present invention is predicated on a solution which, as a rule, may do without the use of additional springs, whereby the entire arrangement becomes considerably more simple and more light weight, and consists essentially in that the pneumatic spring of at least one of the interconnected wheels or axles is constructed in such a manner that the effective cross section of the spring changes with the spring movement thereof.

In particular, the present invention proposes four rudimentary realizations by the use of which the stiffness of the spring system during spring movement of the frame parallel to the road bed may be varied in a simple manner. In the order of from a larger to a lesser stiffness of the spring system the following arrangements in accordance with the present invention may be used:

(a) The effective cross section of both coordinated pneumatic springs which are interconnected increase during spring movements thereof.

(b) The effective cross section of one pneumatic spring increases during spring movement thereof while the cross section of the other spring remains constant during spring movement thereof.

(c) The effective cross section of one pneumatic spring increases during spring movement thereof, while the cross section of the other spring decreases during spring movement. However, with equal spring movements the increase is larger than the decrease.

(d) The effective cross section of one pneumatic spring remains constant during spring movement thereof, while the effective cross section of the other spring decreases during spring movement thereof.

Furthermore, the present invention proposes in connection with vehicles in which the center of gravity displaces itself in the longitudinal direction of the vehicle during loading thereof, that the wheel toward which the center of gravity is displaced is associated with that pneumatic spring in which the ratio between the effective cross section thereof and the effective cross section of the other spring during equal spring movements or strokes of both springs increases.

By the use of such an arrangement it is possible to achieve that the vehicle frame remains completely or at least approximately parallel to the road bed notwithstanding changes in the load.

In principle, a system in accordance with the present invention, once it is filled with the pneumatic pressure medium, should be able to continue to operate without the further supply of a pressure medium. However, in order to provide for compensation of leakage losses and for correcting the spring movements during extremely heavy or unilateral loads, the present invention recommends, however, that at least one of the wheels upon reaching a predetermined extreme position actuate a pneumatic valve for replenishing or discharging the pneumatic equalization spring system.

In installations in which the effective cross section of the pneumatic spring of one wheel changes during spring movement thereof and the effective cross section of the spring of the other wheel remains constant during spring movement thereof, it is advantageous if the switch for filling or discharging the pneumatic equalization spring system be actuated in dependence on extreme stroke positions of that wheel which is associated with the spring having an essentially constant effective cross section. For during discharge of the pneumatic system as a result of leakage losses in such installations the frame lowers itself only within the region of that wheel in which the effective cross section of the spring does not change during spring movement thereof.

With the usual types of motor vehicles, in which the center of gravity is displaced rearwardly during loading, it is preferable to provide an overall installation in which the effective cross section of the pneumatic spring of the rear wheel increases with spring movement thereof, while the effective cross section of the pneumatic spring of the front wheel remains at least approximately constant, and in which the valve for filling or discharging the pneumatic equalization spring system is actuated in dependence on the extreme or limit stroke positions of the front wheel, i.e., on spring movements of the front wheel of predetermined limit value in either direction.

Pneumatic spring installations having a variable effective cross section are known in a number of different constructional embodiments, for example, of so-called "rolling-type" bellows with opposite conical abutment surfaces.

A particularly simple installation according to the present invention is made possible if an ordinary bellows made of flexible material is used as the pneumatic spring system with a cross section which effectively changes, the outer diameter of which is determined at the places at which it is clamped and possibly at other places in between by rigid rings, preferably by metallic rings. Air chambers or spaces formed by rolling-type bellows having cylindrical abutment surfaces may be preferably used as air springs having an effective cross section which remains essentially constant.

Accordingly, it is an object of the present invention to provide a pneumatic spring equalization system in which changes in the load are compensated for without the need of additional springs to provide adequate stabilization of the vehicle.

Another object of the present invention is to provide such a pneumatic spring equalization system as will provide the necessary stabilization about an essentially horizontal cross axis without the use of additional springs.

Still a further object of the present invention is to provide a simple and reliable pneumatic spring equalization system which keeps the vehicle essentially parallel to the road bed notwithstanding changes in the load.

Another object of the present invention is to provide a pneumatic spring equalization system in which the overall stiffness of the spring system may be readily controlled by providing an effective cross section in the pneumatic springs which changes according to a predetermined law during spring strokes or movements of the associate axle or wheel.

Further objects, features and advantages of the present invention will become more obvious from the following description, when taken in connection with the accompanying drawing which shows, for purposes of illustration only, several embodiments in accordance with the present invention and wherein:

Figure 1 is a schematic view of the overall installation of a pneumatic equalization spring system in accordance with the present invention for a passenger motor vehicle, in which the effective cross section of the rear spring increases during spring movement thereof and the effective cross section of the front spring remains essentially constant.

Figure 2 is a schematic view of the principle of an installation in which the cross section of the rear spring increases more than the decrease of the front spring.

Figure 3 is a schematic view in principle of an installation in which the cross section of the rear spring remains constant while the cross section of the front spring decreases.

Figure 4 is a schematic view in principle of an installation in which the cross sections of the front and rear springs increase.

Figure 5 is a cross-sectional view of a pneumatic spring having constant cross section constructed as a rolling-type bellows.

Figure 6 is a pneumatic spring having a cross section which decreases with the stroke thereof and constructed as a rolling-type bellows, Figure 7 is a pneumatic spring having a cross section which changes during the stroke thereof in connection with a bellows construction of the usual type, and Figure 8 is a pneumatic spring having a cross section which increases with the stroke thereof and is constructed as a rolling-type bellows.

Referring now more particularly to Figure 1 of the drawing, reference numeral 1 designates the front wheel of a motor vehicle. A spring cylinder 2 for a pneumatic spring is operatively connected or associated with the front wheel 1. A spring cylinder 4 of a pneumatic spring is operatively connected or associated with the rear wheel 3. The stroke or spring movements of the wheels 1 and 3 are transmitted by means of rods 5 and 6 to the pistons 7 and 8 of the front and rear pneumatic springs respectively. The air chambers or spaces which are disposed above the pistons 7 and 8 are interconnected with each other by means of an equalization line 10 which is provided with a throttling place 9.

The spring movements of the wheel 1 are transmitted over an angle lever 12 pivoted at the vehicle at 11 and over a rod 13 to a pneumatic valve 14 which controls the supply of the air stored in the compressed-air storage tank or reservoir 15 to the equalization line 10.

The pneumatic springs 2, 7 and 4, 8 respectively, are illustrated in Figure 1 only schematically. The same is also true in connection with Figures 2, 3, and 4 in which corresponding reference numerals of the 200, 300 and 400 series respectively are used to designate the schematically illustrated pneumatic springs 202, 207, and 204, 208, and 302, 307 and 304, 308, and 402, 407 and 404, 408 respectively. However, for example, the straight cylinder 2 in Figure 1 is supposed to indicate that the effective cross section for the pneumatic medium or air which acts on the piston 7 is essentially independent of the piston stroke and therewith of the wheel stroke or spring movement thereof. The cylinder 4 with the conically-shaped wall and the piston 8 of Figure 1 is to be thought of in such a manner that the diameter and, consequently, the effective area of the piston changes in relation to a change in the diameter of the cylinder corresponding to the particular position of the piston, i.e., that with a movement of the wheel 3 upwardly the effective cross section of the air acting on the piston is increased. The same is also true for the corresponding constructions of Figures 2 to 4 in which the various pistons are illustrated schematically and which only indicate in principle different modifications of the installation in accordance with the present invention. Actual constructions of a bellows-type pneumatic spring in which the effective cross section varies will be more fully discussed hereinafter with reference to Figures 6 and 7.

Those additional elements and mechanisms indicated in Figure 1, for example, by reference numerals 9 and 11 to 15, are not illustrated in Figures 2 to 4. However, it is understood that the embodiments according to Figures 2 to 4 may also be provided with similar elements or arrangements.

If the embodiments according to Figures 1 to 4 are to be arranged according to the stiffness of the spring during spring movement of the frame parallel to the road bed then the following is the sequence from a relatively stiff to a relatively more soft spring system: Figure 4, Figure 1, Figure 2, and Figure 3.

Figures 5 to 7 indicate schematically various embodiments of pneumatic or air springs. In Figure 5 the piston 507 is connected over a rod 505 with the axle or spring suspension, for example, of the front wheel 1 of Figure 1. A rolling-type bellows 516 is provided between the piston 507 and the cylinder 502. The effective cross section or diameter of the air cushion of the equalization spring system which acts on the piston 507 is designated by reference character D. As may be readily seen from the drawing, this diameter D does not change with any positions of the piston 507.

The pneumatic or air springs according to Figures 6 and 8 distinguish from that according to Figure 5 particularly in that the abutment surfaces for the bellows 616 and 616' are conically-shaped in opposite directions. By such a construction, the effective diameters D of the springs illustrated in Figures 6 and 8 are different depending on the particular stroke position of the piston 607 or 607'. Figures 6 and 8 differ in that the effective cross section of the spring illustrated in Figure 6 decreases with the upward stroke of the piston, and the effective cross section of the spring illustrated in Figure 8 increases with the upward stroke of the piston. This is due to the opposite angles of the abutment surfaces for the bellows. A pneumatic spring as illustrated in Figure 6 may, for example, be used in connection with the front wheels of Figures 2 or 3. A pneumatic spring as illustrated in Figure 8 may, for example, be used in connection with the rear wheels of Figures 1 and 2 and the front and rear wheels of Figure 4.

In Figure 7, the rod 706 which is to be assumed to be connected with the axle or wheel suspension, for example, of the rear wheel 3 of Figure 1, is connected over a usual air bellows 716 with the part 704 rigidly connected with the vehicle frame. In the illustrated position of this figure, reference character D again designates the effective diameter of the air spring. During compression of the bellows 716, i.e., during upward spring movement of the rear wheel 3, the bellows is bent more sharply, for example, at the places 717 about the clamping rings 718. As a result thereof, the fibers of the bellows 716 which are disposed or located along the outer surfaces of the curvature, i.e., along the surfaces thereof having the larger radius of curvature, are elongated to a large extent, and because of the relatively slight resiliency of the reinforcing web embedded in the walls of the bellows 716 act effectively as essentially rigid bodies whereby the effective diameter D increases.

However, it is understood that instead of the air spring arrangements of Figures 6 and 7 any other type of known air spring having an effective cross section which varies with the stroke may be used.

The operation of the installation in accordance with the present invention is as follows:

Figure 1 illustrates the equilibrium position of a vehicle which is unloaded. The fact that a stabilizing force with respect to rotations of the vehicle about a horizontal cross axis is inherent in this system which stalibizing force always returns the same into the center position illustrated in the drawing may be readily seen from a consideration of what would take place if by means of an external force, for instance, on the rear of the vehicle, the vehicle were to assume an inclined position. In that case, after removal of the external displacing force the air pressure which exists in the equalization system would exert the same force on the piston 7 as before in the front part of the vehicle, but would exert a relatively larger force on the rear spring as the piston 8 had moved upwardly relative to the vehicle frame and had thereby increased its effective surface.

However, since no larger wheel load and therewith no larger counterforce corresponds to this larger force exerted on piston 8, the piston 8 would again move downwardly relative to the vehicle frame for such a length of time until the effective cross section thereof again had become so small that the cross section times pressure would correspond exactly to the force of the particular applied wheel load. As a result thereof, the illustrated center position would again be attained.

During loading of the vehicle, as is usual in passenger motor vehicles, the center of gravity of the vehicle may move rearwardly. The wheel loading ratio between the rear wheel and the front wheel would thereby become greater, i.e., a larger part of the weight would fall on the rear wheel. In order to reestablish an equilibrium in that case, the effective surface of the spring of the rear wheel would have to increase, i.e., the frame would have to lower itself over the rear wheel to such an extent that the surface ratio between the pistons 8 and 7 resulting therefrom would correspond to the new wheel load ratio between the wheels 3 and 1. By appropriately selecting the cross sections, etc. it is possible to obtain by the use of such a construction that in this load condition the vehicle frame would also remain parallel to the road bed. This is the case if the air in the equalization system is compressed more as a result of the increase in the front wheel load and therewith of the increase of the air pressure than corresponds to the displacement in the rear spring, and more particularly, by such an amount that the vehicle frame lowers itself over the front wheel by an equally large amount as over the rear wheel.

If the air pressure should escape with time from the equalization system as a result of leakages, then the front part of the vehicle would lower itself by an amount corresponding to the volume of escaped air. Upon reaching a predetermined limit position, the rod 13 which is actuated by the angle lever 12 has been displaced by such an amount that it actuates the pneumatic valve 14 which enables the supply of pressurized air from the tank or reservoir 15 to replenish the equalization line 10. The reservoir 15 may be filled by an air compressor which is arranged in the vehicle or from the outside thereof or after exhaustion of its air supply may be exchanged for a new one.

The equalization line 10 is provided with a throttling place 9 which is intended to dampen undesired oscillations or movements of the equalization air from in front to the rear and vice versa and is thereby intended to prevent nodding movements of the vehicle.

The present invention is not limited to the illustrated embodiments but is susceptible of many changes and modifications within the spirit of the present invention and I intend to cover all such changes and modifications except as defined by the appended claims.

I claim:
1. A pneumatic equalization system operatively connected between a front and a rear wheel of a vehicle having a body and a plurality of wheels, especially a motor vehicle, comprising pneumatic spring means for each of said two wheels, the pneumatic spring means of one of said wheels being so constructed and arranged that the effective cross section thereof continuously changes during spring movements thereof and the pneumatic spring means of the other of said wheels being so constructed and arranged that the effective cross section thereof remains essentially constant, means for interconnecting the two spring means for equalization therebetween, means for selectively replenishing and discharging said pneumatic system, and means operatively connected to the other of said wheels to actuate said replenishing and discharging means upon attaining a position corresponding to predetermined spring movements of said other wheel, said pneumatic spring means constituting the sole means for springily supporting the body of said vehicle on said wheels.

2. A pneumatic equalization spring system according to claim 1, wherein the other of said spring means having an essentially constant effective cross section is formed by a rolling-type bellows.

3. A pneumatic equalization system operatively connected between a front and a rear wheel of a vehicle as defined in claim 1, wherein the effective cross section of the pneumatic spring means of said front wheel decreases during spring movements thereof, and wherein the effective cross section of the pneumatic spring means of said rear wheel remains essentially constant during spring movements thereof.

4. A pneumatic equalization spring system according to claim 1, wherein the pneumatic spring means of said one of the wheels having a changing effective cross section is formed by a rolling-type bellows.

5. A pneumatic equalization spring system according to claim 4, wherein said pneumatic spring includes two conically-shaped abutment surfaces for the bellows, said abutment surfaces being angled in opposite directions.

6. A pneumatic equalization system operatively connected between a front and a rear wheel of a vehicle having a body and a plurality of wheels, especially a motor vehicle, comprising pneumatic spring means for each of said two wheels, the pneumatic spring means of said front wheel being so constructed and arranged that the effective cross section thereof remains essentially constant and the pneumatic spring means of said rear wheel being so constructed and arranged that the effective cross section thereof increases during spring movements thereof, means for interconnecting the two spring means for equalization therebetween, means for selectively replenishing and discharging said pneumatic system, and means operatively connected to said front wheel to actuate said replenishing and discharging means upon attaining a position corresponding to pedetermined spring movements of said front wheel, said pneumatic spring means constituting the sole means for springily supporting the body of said vehicle on said wheels.

References Cited in the file of this patent
UNITED STATES PATENTS

| | | |
|---|---|---|
| 850,180 | Podstata | Apr. 16, 1907 |
| 1,077,472 | Hofmann | Nov. 4, 1913 |
| 1,344,334 | Croonholm | June 22, 1920 |
| 2,488,288 | Gouirand | Nov. 15, 1949 |
| 2,691,420 | Fox | Oct. 12, 1954 |
| 2,733,934 | Muller | Feb. 7, 1956 |

FOREIGN PATENTS

| | | |
|---|---|---|
| 7,295 | Great Britain | 1910 |
| 17,813 of 1914 | Great Britain | July 28, 1915 |